(12) United States Patent
Venigalla (10) Patent No.: US 8,040,660 B2
(45) Date of Patent: Oct. 18, 2011

(54) HIGH VOLTAGE NIOBIUM OXIDES AND CAPACITORS CONTAINING SAME

(75) Inventor: Sridhar Venigalla, Macungie, PA (US)

(73) Assignee: Cabot Corporation, Boston, MA (US)

( * ) Notice: Subject to any disclaimer, the term of this patent is extended or adjusted under 35 U.S.C. 154(b) by 496 days.

(21) Appl. No.: 12/171,316

(22) Filed: Jul. 11, 2008

(65) Prior Publication Data

US 2009/0073640 A1  Mar. 19, 2009

Related U.S. Application Data (60) Provisional application No. 60/950,450, filed on Jul. 18, 2007.

(51) Int. Cl.
*H01G 9/04* (2006.01)
*H01G 9/145* (2006.01)
*C01G 31/02* (2006.01)
*C01G 33/00* (2006.01)
*C01G 35/00* (2006.01)

(52) U.S. Cl. .................................. 361/528; 423/594.17

(58) Field of Classification Search .................. 361/528, 361/529; 423/594.17
See application file for complete search history.

(56) References Cited

U.S. PATENT DOCUMENTS

| | | | |
|---|---|---|---|
| 4,483,819 A * | 11/1984 | Albrecht et al. ................. | 75/245 |
| 4,805,074 A | 2/1989 | Harakawa et al. | |
| 5,198,967 A | 3/1993 | Kuranuki et al. | |
| 5,211,741 A | 5/1993 | Fife | |
| 5,245,514 A | 9/1993 | Fife et al. | |
| 5,412,533 A | 5/1995 | Murayama et al. | |
| 6,171,363 B1 | 1/2001 | Shekhter et al. | |
| 6,322,912 B1 | 11/2001 | Fife | |
| 6,373,685 B1 | 4/2002 | Kimmel et al. | |
| 6,391,275 B1 | 5/2002 | Fife | |
| 6,416,730 B1 | 7/2002 | Fife | |
| 6,462,934 B2 | 10/2002 | Kimmel et al. | |
| 6,527,937 B2 | 3/2003 | Fife | |
| 6,558,447 B1 | 5/2003 | Shekhter et al. | |
| 6,576,099 B2 | 6/2003 | Kimmel et al. | |
| 6,592,740 B2 | 7/2003 | Fife | |
| 6,639,787 B2 | 10/2003 | Kimmel et al. | |
| 6,759,026 B2 | 7/2004 | Kimmel et al. | |
| 6,876,083 B2 * | 4/2005 | Yano et al. ..................... | 257/764 |
| 6,992,881 B2 * | 1/2006 | Reichert et al. ............... | 361/528 |
| 7,355,842 B2 * | 4/2008 | Naito ............................. | 361/540 |
| 7,381,396 B2 | 6/2008 | Thomas et al. | |
| 2001/0036056 A1 | 11/2001 | Kimmel et al. | |
| 2002/0114722 A1 | 8/2002 | Kimmel et al. | |

(Continued)

FOREIGN PATENT DOCUMENTS

EP  0 634 761 A1  1/1995

(Continued)

OTHER PUBLICATIONS

The International Search Report and Written Opinion from PCT/US2008/069718 dated Feb. 11, 2009, sixteen pages.

(Continued)

*Primary Examiner* — Eric Thomas
*Assistant Examiner* — David M Sinclair (57) ABSTRACT

$Nb_{1-x}Ta_xO$ powder wherein x is 0.1 to 0.5 is described. Further, this powder, as well as niobium suboxide powders, can be doped with at least one dopant oxide. Pressed bodies of the powder, sintered bodies, capacitor anodes, and capacitors are also described.

10 Claims, 6 Drawing Sheets

U.S. PATENT DOCUMENTS

| | | |
|---|---|---|
| 2002/0135973 A1 | 9/2002 | Kimmel et al. |
| 2002/0172861 A1 | 11/2002 | Kimmel et al. |
| 2003/0026756 A1 | 2/2003 | Kimmel et al. |
| 2003/0104923 A1* | 6/2003 | Omori et al. ............. 501/134 |
| 2004/0040415 A1 | 3/2004 | Kimmel et al. |
| 2005/0008564 A1 | 1/2005 | Reed et al. |
| 2005/0013765 A1* | 1/2005 | Thomas et al. ............ 423/592.1 |
| 2005/0025699 A1 | 2/2005 | Reed et al. |
| 2005/0084445 A1 | 4/2005 | Kimmel et al. |
| 2006/0091020 A1* | 5/2006 | Hossick-Schott et al. .... 205/333 |

FOREIGN PATENT DOCUMENTS

| | | |
|---|---|---|
| EP | 0 634 762 A1 | 1/1995 |
| GB | 2403216 B | 2/2005 |
| WO | WO 2006/128687 A2 | 12/2006 |

OTHER PUBLICATIONS

De Holanda J N F et al., "Study on Sintered Anodes of Nb-Ta-Al Aluminothermic Alloys," 1999, INSPEC Database, The Institution of Electrical Engineers, XP002512851, one page.

* cited by examiner

| TEXT_ID | Ta | Fe+Ni+Cr | DCL@30V | DCL@45V | DCL@60V |
|---|---|---|---|---|---|
| Undoped NbO Control, co-processed | 4040 | 32 | 29.2 | 26.6 | 41.3 |
| $Y_2O_3$ Doped NbO - Sample 1 | 251 | 14 | 19.1 | 19.3 | 17.3 |
| $Y_2O_3$ Doped NbO - Sample 2 | 200 | 50 | 16.0 | 22.2 | 30.0 |
| $Y_2O_3$ Doped NbO - Sample 3 | 16161 | 85 | 15.0 | 32.4 | 32.0 |
| $SiO_2$ Doped NbO | 3374 | 42 | 12.4 | 15.5 | 15.1 |
| $Mn_2O_3$ Doped NbO | 1209 | 12 | 12.0 | 16.1 | 19.3 |
| Independent NbO Standard | 146 | 15 | 13.9 | 18.8 | 26.0 |

FIG. 14

HIGH VOLTAGE NIOBIUM OXIDES AND CAPACITORS CONTAINING SAME

This application claims the benefit under 35 U.S.C. §119 (e) of prior U.S. Provisional Patent Application No. 60/950,450, filed Jul. 18, 2007, which is incorporated in its entirety by reference herein.

BACKGROUND OF THE INVENTION

The present invention relates to niobium oxides, such as niobium suboxides, and further relates anodes and capacitors made therefrom.

As described in U.S. Pat. Nos. 6,759,026; 6,639,787; 6,592,740; 6,576,099; 6,527,937; 6,462,934; 6,416,730; 6,391,275; 6,373,685; and 6,322,912; and U.S. Published Patent Application Nos. 2005/0084445; 2004/0040415; 2003/0026756; 2002/0172861; 2002/0135973; 2002/0114722; 2001/0036056; 2005/0025699; and 2005/0008564 (all incorporated in their entirety by reference herein), niobium suboxides have been developed which are useful in forming anodes for capacitor applications. These powders, when formed into anodes, can have a capacitance up to about 200,000 CV/g or more and can have low DC leakage, for instance, from about 0.1 nA/CV to about 5.0 nA/CV. As described in these patents, the typical formation voltage for these niobium suboxide products, when formed into an anode, can be from about 6 to about 70 volts and preferably about 35 volts. These patents describe other high formation voltages, such as from 70 volts to about 130 volts. While these above-described patents describe a balance of properties with respect to DC leakage, capacitance, and formation voltage, as higher formation voltages are used, typically, the DC leakage increases, which can result from elevated electronic and/or ionic conduction in the dielectric layer at high voltage stresses. High conductivity can be a result of contaminants in the powder and a variety of defects generated during the anodization process, such as oxygen vacancies, crystallization, physical defects, and the like. Capacitor powder manufacturers have traditionally dealt with this problem by reducing the level of contaminants in the powder. However, this approach has technical and commercial limitations due to the high costs of purifying the materials, as well as other technical reasons. Accordingly, it would be highly desirable to stabilize the dielectric layer such that the charge carriers are immobilized or compensated thereby allowing the ability to form niobium suboxide powders at a higher formation voltage and yet preferably obtain low DC leakage.

SUMMARY OF THE PRESENT INVENTION

A feature of the present invention is to provide niobium suboxide materials that have anodization constants that can be lowered so that higher voltage formation is facilitated.

A further feature of the present invention is to achieve higher voltage formation while controlling DC leakage at high voltage formations. A further feature of the present invention is to provide powders which can facilitate high voltage formation.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to a $Nb_{1-x}Ta_xO$, wherein x is 0.1 to 0.5.

The present invention further relates to powder comprising the $Nb_{1-x}Ta_xO$ powder.

Also, the present invention relates to a $Nb_{1-x}Ta_xO$ powder that is doped with at least one dopant oxide.

Furthermore, the present invention relates to sintered pressed bodies comprising the powder of the present invention and capacitor anodes made therefrom.

Also, the present invention relates to a niobium suboxide powder having the formula $Nb_xO_y$ that is doped with at least one dopant oxide, wherein x is less than 2 and y is less than 2.5x.

The present invention further relates to sintered pressed bodies and anodes made from this niobium suboxide powder.

Also, the present invention relates to powders, sintered pressed bodies, capacitor anodes, and capacitors having beneficial properties achieved with the use of one or more powders of the present invention, such as the ability to form at higher voltage formation and yet achieve stable DC leakage and/or lowering the anodization constant. Other benefits are further described.

It is to be understood that both the foregoing general description and the following detailed description are exemplary and explanatory only and are intended to provide a further explanation of the present invention, as claimed.

The accompanying drawings, which are incorporated in and constitute a part of this application, illustrate some of the embodiments of the present invention and together with the description, serve to explain one or more principles of the present invention.

DETAILED DESCRIPTION OF THE PRESENT INVENTION

In an embodiment of the present invention, the present invention relates to a $Nb_{1-x}Ta_xO$ powder, wherein x is 0.1 to 0.5. For purposes of the present invention, the powder can comprise this $Nb_{1-x}Ta_xO$ powder or the $Nb_{1-x}Ta_xO$ powder can be present as a majority of the overall powder present as a layer or as a mixture, for example. The $Nb_{1-x}Ta_xO$ powder can be present in amounts up 90% by weight or more, such as 99% or 99.9% or higher or 100%. The $Nb_{1-x}Ta_xO$ powder can be the primary powder present, wherein any other powder present would be considered an impurity. In other words, the powder can consist essentially of or consist of $Nb_{1-x}Ta_xO$ powder. As an option, x can be 0.2 to 0.4 or 0.25 to 0.35 or any other ranges within the range of 0.1 to 0.5 (e.g., 0.15, 0.2, 0.25, 0.3, 0.35, 0.4, 0.45). The $Nb_{1-x}Ta_xO$ powder can be a crystalline $Nb_{1-x}Ta_xO$ powder and/or an amorphous $Nb_{1-x}Ta_xO$ powder or any mixture or combination thereof.

Powder physical properties are presented in Tables 4, 8, 12, and 16 that include a BET surface area (1.32-1.81 $m^2/g$), Scott density (20.4-25.9 $g/in^3$), and average particle size (d50) as measured by Horiba LA-910 light scattering method (without and with 120 s ultrasonication), 80-124 μm, and 28-42 μm respectively. The powder of the present invention can have any one or more of these above properties. The BET surface area can be from 1 $m^2/g$ to 3.0 $m^2/g$ or higher, or from 1.2 to 2.5 $m^2/g$, or from 1.3 $m^2/g$ to 2.2 $m^2/g$ or from 1.4 $m^2/g$ to 2.0 $m^2/g$. The Scott density can be from 17 $g/in^3$ to 30 $g/in^3$ or from 18 $g/in^3$ to 28 $g/in^3$ or from 20 $g/in^3$ to 28 $g/in^3$. The Scott density can be below or above any of these limits. The flow can be acceptable flow rates as determined by commercially acceptable standards for niobium or tantalum powders. The powder flow can be measured based on ASTM B 213-97.

The average particle size (d50) without 120 s ultrasonication can be from 60 to 175 μm or from 65 to 160 μm or from 75 to 150 μm or from 35 to 140 μm. The average particle size (d50) with 120 s ultrasonication can be from 15 to 60 μm or from 20 to 50 μm or from 25 to 45 μm. The average particle size can be below or above any of these limits. The powder of the present invention can have one or more of these properties. The powder can be unagglomerated or agglomerated.

In one or more embodiments, the $Nb_{1-x}Ta_xO$ powder can be doped with at least one dopant oxide. As an example, the powder can be doped with at least one oxide of Y, Si, Mn, Al, Ce, V, or a combination thereof. Specific examples include, but are not limited to, $Y_2O_3$, $SiO_2$, $Mn_3O_4$, $Al_2O_3$, $Mn_2O_3$, $CeO_2$, or $V_2O_3$. The powder can be doped with at least one dopant having a cation valancy of +2 or higher (e.g., +3, +4). The dopant can have an ionic size that is within 10% of the ionic size of niobium. In other words, the dopant can have an ionic size that is the same as or larger than or smaller than the ionic size of niobium and can be, for instance, within 10% of the ionic size of niobium.

The dopant oxide can be present with the $Nb_{1-x}Ta_xO$ powder in any amount. For instance, the amount can be an amount sufficient to lower the DC leakage characteristics of the material compared to no dopant oxide being present. The amount of the dopant oxide present can be, for example, 3% by weight or less based on the overall weight of the powder. For instance, the amount of the dopant oxide can range from 0.25 to 3% by weight, from 0.5 to 2.5% by weight, from 0.5 to 2% by weight, or from 0.5 to 1.75% by weight. It is to be understood that these ranges can also be approximate ranges. Thus, as an option, each range can be understood to include the term "about" before each numerical number. For instance, 0.25 to 3% by weight can also be, as an option, from about 0.25 to about 3% by weight and so on.

The dopant oxide, as an option, can have any purity level. For instance, the purity level of the dopant oxide can be 95% or higher with respect to purity by wt %. Other ranges include 98% purity or higher, 99% purity or higher, 99.5% purity or higher, 99.9% purity or higher, or 99.995% purity or higher. Suitable ranges are from 95% to 99.995% purity or higher, 98% to 100% purity, and so on.

The dopant oxide can be introduced into the $Nb_{1-x}Ta_xO$ powder by any technique, such as by blending the dopant oxide, if present as a solid (e.g., powder) with the $Nb_{1-x}Ta_xO$ powder. Preferably, a uniform blending is achieved to properly distribute the dopant oxide throughout the $Nb_{1-x}Ta_xO$ powder. Other techniques to dope the $Nb_{1-x}Ta_xO$ powder include, but are not limited to, the use of a gas, liquid, or any combination thereof. The dopant oxide can be introduced wherein the metal precursor of the dopant oxide is introduced and then oxidized to form the dopant oxide. Dopants can also be applied as surface coatings on the separate, blended, or comilled substrate particles. Coatings can be applied via precipitation of a dopant oxide from a liquid dopant precursor in the presence of substrate particles, or by evaporating (drying) a mixture of substrate particles and liquid dopant precursor. Alternatively, dopants can be applied to NbO or $Nb_{1-x}Ta_xO$ powders during capacitor anode fabrication prior to sintering.

In one or more embodiments of the present invention, the present invention further includes forming a pressed body from the powder of the present invention. This pressed body can be a green body. Also, the pressed body can be sintered to form a sintered anode or capacitor anode using conventional techniques of pressing, sintering, and the like. Further, the capacitor anode can be included as a component to form a capacitor (e.g., wet or dry solid capacitors). Also, the capacitor anode can have a dielectric layer formed on the capacitor anode. Any press density can be used in forming the pressed body of powder. For instance, the press density can be 3.0 g/cc or higher. For instance, the press density can be from 3.0 g/cc to 3.75 g/cc. The press density can be 3.1 g/cc or 3.2 g/cc or 3.3 g/cc, which is especially useful in high voltage formation capacitor anodes. For instance, the press density can be useful for capacitor anodes formed at a formation voltage of 60 volts to 75 volts with a capacitance of 60,000 to 75,000 CV/g. The capacitor anodes of the present invention can be incorporated in capacitor designs having A, B, C, and D case sizes.

In one or more embodiments of the present invention, the sintered anode from the $Nb_{1-x}Ta_xO$ powder can have a cumulative volume of pores greater than 1 micron diameter (e.g., 1.1 micron to 10 microns), which can be maintained at 0.010 mL/g or greater levels (such as 0.050 mL/g to about 0.1 mL/g, or 0.025 mL/g to about 0.07 mL/g), even at higher press densities, such as 3.0 g/cc or higher, including the ranges described above with respect to press densities. These pore volumes are sufficient for cathode impregnation in forming the capacitor. Further, these sintered anode pore volumes can be achieved along with a capacitor anode having desirable capacitance, such as from 50,000 CV/g to 75,000 CV/g or higher with a formation voltage of from 60 volts to 75 volts.

$Nb_{1-x}Ta_xO$ powder doped with an oxide of Si or an oxide of Mn, such as $SiO_2$ and/or $Mn_2O_3$ were most favorable in obtaining lower DC leakage at all press densities and sintering temperatures.

The dopant oxide can have any physical and chemical characteristics. For example, the dopant oxide can have a variety of different surface areas that can be used. The surface area of the dopant oxide can be with respect to BET surface area, from about 0.1 to about 500 $m^2/g$, such as from about 1 to about 50 $m^2/g$ or 3 to 25 $m^2/g$.

The dopant oxides can have the ability to suppress the negative effects of metal contamination on DC leakage. More particularly, the dopant oxides can suppress the effect of impure Nb metal, if the Nb metal has impurities present. With the use of dopant oxides, the purity of $Nb_{1-x}Ta_xO$ powder or the niobium suboxide powder having the formula $Nb_xO_y$ can be from about 99 wt % to about 90 wt % with respect to purity of the Nb suboxide, and preferably obtain comparable lower DC leakage as if a $Nb_xO_y$ or $Nb_{1-x}Ta_xO$ material has a purity of 99.9 wt % is used.

In one or more embodiments of the present invention, anodes formed from the $Nb_{1-x}Ta_xO$ powder can have a DC leakage of less than about 5.0 nA/CV, such as from about 0.10 nA/CV to 4.5 nA/CV. Further, the anode can have a capacitance of from 50,000 CV/g to 75,000 CV/g or higher based on a voltage formation of 60 volts to 75 volts with a formation temperature of 90° C. and wherein the capacitor anodes are formed with a pressed density of 3.0 g/cc to 3.5 g/cc, and wherein the anode is sintered at a temperature of from 1200° C. to 1750° C. (such as from 1200° C. to 1400° C. or 1350° C.) for 10 minutes. The sintering time can be lower or higher. For purposes of the present invention, all recited capacitances are based on the above test standards.

In one or more embodiments of the present invention, once a dielectric layer is formed on the capacitor anode of the present invention, using microscopic analysis, no field-induced crystallization within the dielectric layer occurs. Thus, in one or more embodiments of the present invention, the present invention relates to a capacitor anode made from $Nb_{1-x}Ta_xO$ powder or powder containing the same with a dielectric layer formed on the capacitor anode (e.g., $Nb_2O_5$) and wherein the dielectric layer does not have any field-induced crystallization within the dielectric layer. The lack of any field-induced crystallization within the dielectric layer can be present with any of the anodes of the present invention including anodes formed at a formation voltage of from 60 volts to 75 volts or higher and, optionally, with the DC leakage and/or capacitance ranges provided above.

In one or more embodiments of the present invention, the capacitor anode formed from the $Nb_{1-x}Ta_xO$ powder can have no or minimal amounts of $Ta_2O_5$ present in the powder. For instance, preferably no $Ta_2O_5$ is present in the anode of the present invention. The capacitor anode of the present invention can have trace amounts of $Ta_2O_5$ present in the capacitor anode, such as from about 0.01 wt % to about 5.0 wt % or from about 0.1 wt % to about 0.5 wt %. The $Ta_2O_5$ can be with respect to crystalline $Ta_2O_5$, which can be present as a crystalline $Ta_2O_5$ phase in the powder.

In preparing the $Nb_{1-x}Ta_xO$ powder, it can be prepared, for instance, using tantalum oxides or tantalum hydroxides along with niobium hydroxides or niobium oxides. Using a process similar to the process described in the above-identified patents, these feed materials can be optionally calcined to transform them to tantalum oxide or niobium oxide if the starting material was not an oxide to begin with. These materials can then be mixed with niobium or NbH and subjected to heat treatment(s) to obtain the $Nb_{1-x}Ta_xO$ powder. The heat treatment(s) can be at any temperature sufficient to convert the feed materials to the $Nb_{1-x}Ta_xO$ powder, such as from 800° C. to 1400° C., in vacuum, for 1 hour to 4 hours or more. Other heat treatment times can be used. Depending upon the particular powder desired, this will control the amount of niobium and tantalum feed materials, as shown in the examples, for instance.

With respect to the feed materials, preferably the particle size of the feed materials is from about 0.05 μm to about 10 μm, such as from about 1.0 μm to about 5.0 μm. Other sizes can be used.

In another embodiment of the present invention, the present invention relates to a niobium suboxide powder having the formula $Nb_xO_y$ that is doped with at least one dopant oxide, wherein x is less than 2 and y is less than 2.5x. Typical reduced niobium oxides comprise NbO, $NbO_{0.7}$, $NbO_{1.1}$, $NbO_2$, and any combination thereof with or without other oxides present. Generally, the reduced niobium oxide of the present invention has an atomic ratio of niobium to oxygen of about 1:less than 2, such as 1:1.1, 1:1, or 1:0.7. Put another way, the reduced niobium oxide preferably has the formula $Nb_xO_y$, wherein Nb is niobium, x is 2 or less, and y is less than 2.5x. As examples, x can be 1 and y can be less than 2, such as 1.1, 1.0, 0.7, and the like. The dopant oxides and the other characteristics of the dopant oxides with respect to amounts, examples, and the like are the same as described above. Similar advantages are achieved in this embodiment with respect to lowering the anodization constant, the ability to form at higher voltages as described above, and the ability to stabilize or improve DC leakage as described above. Thus, the various property characteristics of the powder, the pressed body, the sintered pressed body, the capacitor anode, and the capacitor formed therefrom as described above are incorporated in their entirety in this embodiment as well.

In either embodiment the anodization constant can be from about 1.5 nm/V to about 3.5 nm/V, such as from about 2.0 nm/v to about 3.0 nm/V.

Figure 1:
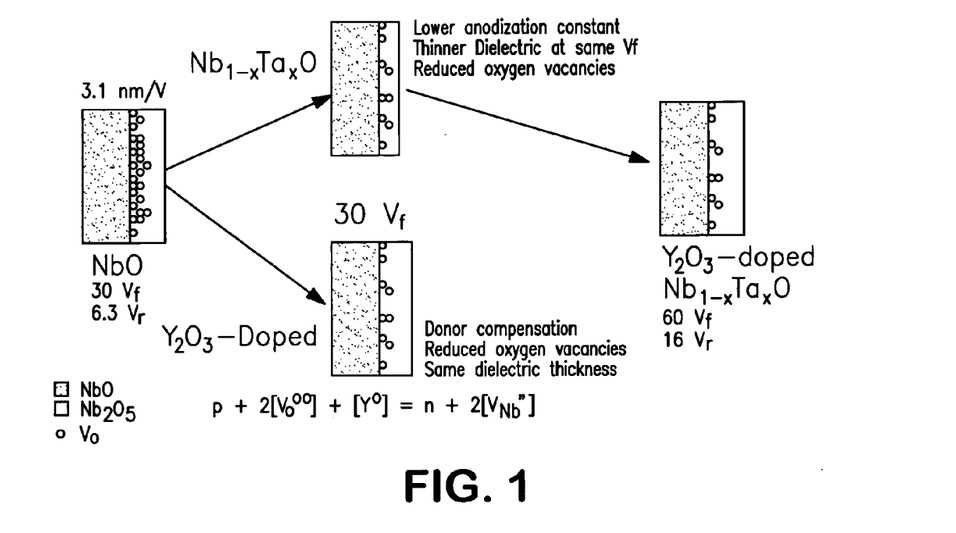
FIG. 1 is a schematic representation of two pathways for formation of high voltage Nb suboxide products.

FIG. 1 provides a schematic representation of the various formation pathways for the embodiments of the present invention.

The method can include the steps of heat treating a starting niobium oxide (or precursor) with the tantalum oxide (or precursor) in the presence of a getter material (e.g., niobium) in an atmosphere which permits the transfer of oxygen atoms from the niobium oxide (and/or tantalum oxide) to the getter material for a sufficient time and at a sufficient temperature to form an oxygen reduced niobium-tantalum oxide.

For purposes of the present invention, the niobium oxide can be at least one oxide of niobium metal and/or alloys thereof. A specific example of a starting niobium oxide is $Nb_2O_5$.

The niobium oxide (or precursor) and/or tantalum oxide (or precursor) used in the present invention can be in any shape or size. Preferably, the niobium oxide (or precursor) and/or tantalum oxide (or precursor) is in the form of a powder or a plurality of particles. Examples of the type of powder that can be used include, but are not limited to, flaked, angular, nodular, and mixtures or variations thereof. Preferably, the niobium oxide and/or tantalum oxide is in the form of a powder which more effectively leads to the oxygen reduced niobium-tantalum oxide. Examples of such preferred powders include those having mesh sizes of from about 60/100 to about 100/325 mesh and from about 60/100 to about 200/325 mesh. Another range of size is from −40 mesh to about −400 mesh.

The getter material for purposes of the present invention is any material capable of reducing the specific starting niobium oxide to the oxygen reduced niobium oxide. Preferably, the getter material comprises tantalum, niobium, or both. Other getter materials can be used or in combination with the tantalum or niobium getter materials. Also, other materials can form a part of the getter material. The getter material can be in any shape or size. The getter materials can be in the form of a powder in order to have the most efficient surface area for reducing the niobium oxide. The getter material, thus, can be flaked, angular, nodular, and mixtures or variations thereof. Generally, a sufficient amount of getter material is present to at least partially reduce the niobium oxide being heat treated. Further, the amount of the getter material is dependent upon the amount of reducing desired to the niobium oxide. In one or more embodiments of the present invention, the process does not require the use of a sacrificial getter. Both oxide ($Nb_2O_5$ and/or $Ta_2O_5$) and getter component (NbH) can be comilled together to form the suboxide materials and ultimately form the target composition.

The heat treating that the starting niobium oxide (or precursor) and/or tantalum oxide (or precursor) is subjected to can be conducted in any heat treatment device or furnace commonly used in the heat treatment of metals, such as niobium and tantalum. The heat treatment of the niobium oxide (or precursor) and/or tantalum oxide (or precursor) in the presence of the getter material is at a sufficient temperature and for a sufficient time to form an oxygen reduced niobium-tantalum oxide. The temperature and time of the heat treatment can be dependent on a variety of factors such as the amount of reduction of the niobium oxide, the amount of the getter material, and the type of getter material as well as the type of starting niobium oxide (or precursor) and/or tantalum oxide (or precursor). Generally, the heat treatment of the niobium oxide will be at a temperature of from less than or about 800° C. to about 1900° C. and more preferably from about 1000° C. to about 1500° C., and most preferably from about 1250° C. to about 1350° C. The heat treatment is performed for a time of from about 5 minutes to about 100 minutes, such as from about 30 minutes to about 60 minutes. Routine testing in view of the present application will permit one skilled in the art to readily control the times and temperatures of the heat treatment in order to obtain the proper or desired reduction of the starting niobium oxide or tantalum oxide. The heat treatment occurs in an atmosphere which permits the transfer of oxygen atoms from the niobium oxide to the getter material. The heat treatment can occur in a hydrogen containing atmosphere which is preferably just hydrogen or in vacuum. Other gases can be used or can also be present with the hydrogen, such as inert gases, so long as the other gases do not react with the hydrogen. The hydrogen atmosphere during the heat treatment can be at a pressure of from about 10 Torr to about 2000 Torr, and more preferably from about 100 Torr to about 1000 Torr, and most preferably from about 100 Torr to about 930 Torr. Mixtures of $H_2$ and an inert gas such as Ar can be used. Also, $H_2$ in $N_2$ can be used to effect control of the $N_2$ level of the niobium oxide. During the heat treatment process, a constant beat treatment temperature can be used during the entire beat treating process or variations in temperature or temperature steps can be used.

The oxygen reduced niobium-tantalum oxides can also contain levels of nitrogen, e.g., from about 100 ppm to about 80,000 ppm $N_2$ or to about 130,000 ppm $N_2$. Suitable ranges includes from about 1,000 ppm $N_2$ to about 50,000 ppm $N_2$ and from about 5,000 ppm $N_2$ to about 15,000 $N_2$.

The present invention also relates to a capacitor anode in accordance with the present invention having a niobium oxide film or other metal oxide film on the surface of the capacitor. The anode can be part of an electrolytic capacitor. The anode can be a solid electrolytic anode or can be a wet anode. Preferably, the film is a niobium pentoxide film. The means of making metal powder into capacitor anodes and various capacitor designs are known to those skilled in the art and can be used herein, such as those set forth in U.S. Pat. Nos. 4,805,074, 5,412,533, 5,211,741, and 5,245,514, and European Application Nos. 0 634 762 A1 and 0 634 761 A1, all of which are incorporated in their entirety herein by reference.

The capacitors of the present invention can be used in a variety of end uses such as automotive electronics, cellular phones, computers, such as monitors, mother boards, and the like, consumer electronics including TVs and CRTs, printers/copiers, power supplies, modems, computer notebooks, disc drives, and the like.

The present invention will be further clarified by the following examples, which are intended to be exemplary of the present invention.

EXAMPLES

Example 1

The following experimental and evaluation methods were used in the examples:

Calcination of Nb and Ta Oxides: As-received $Ta(OH)_5$ or $Nb(OH)_5$ samples were calcined to obtain feed materials (for making NbO based materials using a comilling process as described in U.S. Published Patent Application No. 2005/0025699, incorporated in its entirety by reference herein) with desired particle size and BET surface area. $Ta(OH)_5$ and $Nb(OH)_5$ were transformed to corresponding oxides ($Ta_2O_5$, and $Nb_2O_5$) upon calcination. The calcination occurred in a lab scale muffle furnace (Thermolyne, electric resistance) at a 40-60 g size, using a porcelain crucible. Larger scale calcinations (2-16 kg size) were carried out in the pilot scale electric muffle furnace, using Amersil quartz boats. All calcined materials were screened with 50 mesh, using Sweco vibratory screener before testing for BET surface area.

Preparation of SG Grade NbH: Multiple Lots of NbH were Prepared by Attritor milling NbH in water. Metallurgical grade Nb ingot slices were hydrided and jaw crushed to below 40 mesh particle size grade, followed by coarse wet (in presence of water) grinding in Union Process 5S attritor mill using 3/16" diameter spherical Nb media for about 6 hours. The coarse ground NbH material was then milled again with 1/16" media to produce SG grade NbH. Both 1S and 5S size mills were used with 1/16" size Nb spherical media, running at 410 and 190 RPM, respectively. Typical batch size in 1S mill was about 4 kg, while 5S mill generated lots of 16-20 kg size. Milling time ranged between 20-25 h, for a target BET surface area of 3.8 $m^2/g$. At the end of milling, the slurry was sampled for Horiba particle size analysis and allowed to sit overnight for settling, followed by decanting to obtain a sediment of approximately 50% in solids. The sediment was dried under vacuum at 12° C., followed by screening with 50 mesh to create powder. The final powder was tested for BET surface area, oxygen and hydrogen.

Comilling of NbH and $Ta_2O_5/Nb_2O_5$: Calcined and screened $Nb_2O_5$ and $Ta_2O_5$ materials were hand mixed with NbH powder (~3.5 $m^2/g$) in appropriate mole proportions, as specified for each sample. For samples with $Y_2O_3$ doping, commercially available $Y_2O_3$ nanopowder (25-30 nm, 40-45 $m^2/g$, sigma-aldrich.com) was also added to this mixture. The mixture was then loaded into 01HD attritor mill. Operating conditions for comilling are listed in Table 3. At the end of milling, the slurry was sampled for Horiba particle size analysis and allowed to sit overnight for settling, followed by decanting to obtain a sediment of approximately 50% in solids. The sediment was dried under vacuum at 120C, followed by passivation to obtain a dry cake.

Green screening: Dried comilled mixture was screened to a final maximum granule size (−140 mesh/106 μm), using a SWECO shaker. The powder was screened through a fine mesh in order to lower the bulk density of the final NbO powder to the desired range of 1.1-1.2 g/cc. The final screening step was preceded by a rough 20 mesh and a medium 50 mesh screening steps to avoid excessive damage and screen clogging typically associated with one step screening. The screened product was tested for BET surface area, bulk density, and Horiba particle size distribution.

Conversion to $Nb_xO_y$ or $Nb_{1-x}Ta_xO$: The screened granular mixture was converted to $Nb_xO_y$ or $Nb_{1-x}Ta_xO$ by heat treating at 1350-1375C in vacuum for 4 h, followed by a reaction step @ 850C in hydrogen (2 psig) for 1 hour. A heat treatment step was used to harden the granules sufficiently, so that the product has good flow in powder form, and pore structure in the sintered anode form. All samples have been heat treated at ~50 g size, placed in a 3" alumina crucible. Alumina crucibles were placed inside a 8"×10" Mo tray.

Characterization of $Nb_xO_y$ or $Nb_{1-x}Ta_xO$: Following the heat treatment and reaction process, the $Nb_xO_y$ or $Nb_{1-x}Ta_xO$ samples were screened with 50 mesh to breakup any lumps and remove large agglomerates. The samples were then evaluated for flow, bulk (Scott) density, HORIBA particle size analysis with a 0-2 min sonication time, and wet electrical (CV/g, and DC Leakage at 180 s) evaluation on anodes with 2.8-3.5 g/cc pressed green density followed by sintering at 1380° C. for 10 min. Formation voltage ranged between 30 and 60V. Green crush strength was also evaluated on the pressed anodes. Physical properties of sintered anodes, such as sinter density, and diameter shrinkage, were also measured. XRD analysis was performed at Micron, Inc., using 0.5 degree/min scan rate between 20-45° degrees 2-theta.

Experimental design, raw materials and processing data, and characterization data for $Nb_{1-x}Ta_xO$ samples are shown in Tables 1-4.

TABLE 1

Experimental design for $Nb_{1-x}Ta_xO$

| NbO Sample | $Nb_{1-x}$ Target | $Ta_x$ Target | $O_y$ Target | M/O Target |
|---|---|---|---|---|
| A | 0.88 | 0.12 | 0.98 | 1.02 |
| B | 0.74 | 0.26 | 0.98 | 1.02 |
| C | 0.66 | 0.34 | 0.98 | 1.02 |
| D | 1.00 | 0.00 | 0.98 | 1.02 |

TABLE 2

Raw material information for $Nb_{1-x}Ta_xO$

| | NbH Feed | | $Nb_2O_5$ Feed | | $Ta_2O_5$ Feed | |
|---|---|---|---|---|---|---|
| NbO Sample | Type | Wt (g) | Type (BET) | Wt (g) | Type (BET) | Wt (g) |
| A | SG | 291 | F&X-1.60 m²/g | 134 | DLS-1.00 m²/g | 125 |
| B | SG | 264 | F&X-1.60 m²/g | 46 | DLS-1.00 m²/g | 240 |
| C | SG | 250 | F&X-1.60 m²/g | 0 | DLS-1.00 m²/g | 300 |
| D | SG | 319 | F&X-1.60 m²/g | 231 | DLS-1.00 m²/g | 0 |

F&X - Commerical Supplier of $Nb(OH)_5$ that was calcined to $Nb_2O_5$ to target BET.
DLS - Commercial Supplier of $Ta(OH)_5$ that was calcined to $Ta_2O_5$ to target BET. Similar notations in Tables are used.

TABLE 3

Milling conditions and green milled mixture properties for the four samples made using 01HD attritor mill (500 g batch size) as part of $Nb_{1-x}Ta_xO$ examples

| | 01HD Attritor Mill Cornilling Conditions | | | Milled Slurry Properties | | Green Screening | Screened Granule |
|---|---|---|---|---|---|---|---|
| HD01 Sample | Media (INCH) | Time (min) | Speed RPM | D50-60s US (μm) | BET (m²/g) | Mesh ASTM | Bulk Density (g/in³) |
| A | 1/16 | 120 | 700 | 1.07 | 4.93 | −140 | 15.7 |
| B | 1/16 | 120 | 700 | 1.02 | 4.64 | −140 | 17.8 |
| C | 1/16 | 120 | 700 | 0.97 | 4.29 | −140 | 19.2 |
| D | 1/16 | 120 | 700 | 1.10 | 5.07 | −140 | 13.6 |

D50-60s US = D50 size after 60 seconds of ultrasonication (US). Similar notations in Tables are used.

TABLE 4

Table 4. Post-reaction characterization data for the four samples made as part of $Nb_{1-x}Ta_xO$ study. All samples have been heat treated at 1350 C. for 240 min., followed by reaction in positive $H_2$ atmosphere (860 Torr) at 850 C. for 60 min., in MRF furnace LF2. ~50 g of each sample, placed in a 3" alumina crucible.

| Sample | $Nb_{1-x}Ta_xO$ X= | Powder BET (m²/g) | SCOTT Density (g/in³) | HORIBA PSD (μm) (LA-910) D90 (0s US) | D50 (0s US) | D50 (120s US) | ANODE dP (g/cc) | Green CRUSH (LB) | Wet Electricals @ $30V_f$ Vbias (V) | CV/g (μF·V/g) | DCL @ 180s (nA/CV) | Sinter Density (g/cc) | Sinter Shrinkage (% Dia) |
|---|---|---|---|---|---|---|---|---|---|---|---|---|---|
| D | 0.00 | 1.37 | 20.7 | 147 | 81 | 36 | 2.80 | 1.9 | 2.5 | 112858 | 0.23 | 2.99 | 0.92 |
| | | | | | | | | | 10 | 90023 | 0.29 | | |
| A | 0.12 | 1.78 | 21.4 | 272 | 90 | 37 | 2.80 | 1.9 | 2.5 | 146661 | 3.91 | 2.92 | 0.07 |
| | | | | | | | | | 10 | 105790 | 5.42 | | |
| B | 0.26 | 1.80 | 21.1 | 147 | — | 31 | 2.80 | 1.3 | 2.5 | 139108 | 7.80 | 2.85 | −0.49 |
| | | | | | | | | | 10 | 97158 | 11.17 | | |
| | | | | | | | 3.10 | 1.2 | 2.5 | 135470 | 6.28 | 3.14 | −0.76 |
| | | | | | | | | | 10 | 95227 | 8.94 | | |
| C | 0.34 | 1.78 | 25.2 | 144 | 79 | 35 | 2.80 | 1.0 | 2.5 | 140525 | 10.32 | 2.85 | −0.36 |
| | | | | | | | | | 10 | 100563 | 14.43 | | |
| | | | | | | | 3.10 | 1.6 | 2.5 | 140950 | 7.78 | 3.16 | −0.74 |
| | | | | | | | | | 10 | 102041 | 10.75 | | |

TABLE 4-continued

Table 4. Post-reaction characterization data for the four samples made as part of $Nb_{1-x}Ta_xO$ study. All samples have been heat treated at 1350 C. for 240 min., followed by reaction in positive $H_2$ atmosphere (860 Torr) at 850 C. for 60 min., in MRF furnace LF2. ~50 g of each sample, placed in a 3" alumina crucible.

| Sample | $Nb_{1-x}Ta_xO$ X= | Powder BET ($m^2/g$) | SCOTT Density ($g/in^3$) | HORIBA PSD (μm) (LA-910) | | | ANODE dP (g/cc) | Green CRUSH (LB) | Wet Electricals @ $30V_f$ | | | Sinter Density (g/cc) | Sinter Shrinkage (% Dia) |
|---|---|---|---|---|---|---|---|---|---|---|---|---|---|
| | | | | D90 (0s US) | D50 (0s US) | D50 (120s US) | | | Vbias (V) | CV/g (μF·V/g) | DCL @ 180s (nA/CV) | | |
| | | | | | | | 3.50 | 5.6 | 2.5 | 138415 | 8.20 | 3.52 | −0.83 |
| | | | | | | | | | 10 | 101542 | 11.17 | | |

0s = no sonication
120s US = 120s of ultrasonication

The powder flow rate was acceptable for capacitor grade powders. The bulk density of screened granules gradually increased with increasing Ta concentration.

Physical properties of heat treated and reacted samples listed in Table 4 show that the BET surface area of $Nb_{1-x}Ta_xO$ type samples is significantly higher than the control (pure NbO) sample.

Figure 2:
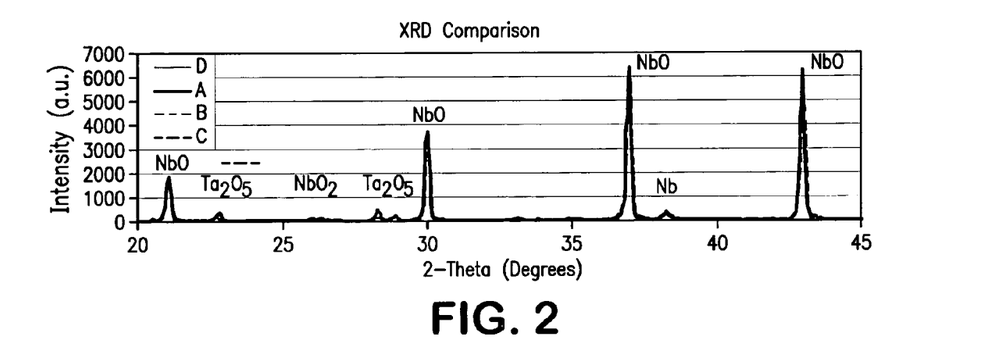
FIGS. 2 and 3 are x-ray diffraction graphs for certain samples of the present invention.
Figure 3:
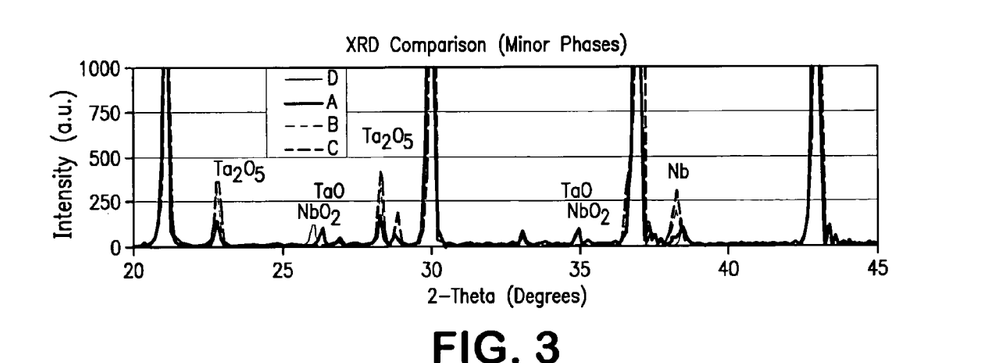

X-ray diffraction data for the heat treated and reacted samples is shown in FIGS. 2 and 3. It is worth noting that major peaks in the XRD pattern for all samples correspond to a pure NbO pattern. This indicates that Ta substitution into the primary NbO lattice has been successful, including the Ta mole fraction of 0.34 used in this experiment. Minor peak (additional phases) analysis show the presence of trace amounts of unreacted $Ta_2O_5$ in all $Nb_{1-x}Ta_xO$ type samples. This is a switch from $NbO_2$ minor phase typically seen in pure NbO samples, indicating that $Ta_2O_5$ is preferentially more stable compared to $NbO_2$.

Example 2

Analysis of $Y_2O_3$-doped Samples. Experimental design, raw materials and processing data, and characterization data for $Y_2O_3$-doped NbO samples are shown in Tables 5-8.

TABLE 5

Experimental design for $Y_2O_3$-doped NbO study

| NbO Lot # | $Y_2O_3$ wt % | Amount (g) | Nb/O Mole Ratio |
|---|---|---|---|
| E | 0.00 | 0.00 | 1.030 |
| F | 1.00 | 5.00 | 1.030 |
| G | 3.00 | 15.00 | 1.030 |

TABLE 6

Raw material information for $Y_2O_3$-doped NbO study

| NbO Lot # | NbH Feed Type | Wt (g) | $Nb_2O_5$ Feed Type | Wt (g) | $Y_2O_3$ wt % | Amount (g) |
|---|---|---|---|---|---|---|
| E | SG | 292 | Duoloshan-1.7 $m^2/g$ | 208 | 0.00 | 0.00 |
| F | SG | 292 | Conghua-1.4 $m^2/g$ | 208 | 1.00 | 5.00 |
| G | SG | 292 | Conghua-1.4 $m^2/g$ | 208 | 3.00 | 15.00 |

Conghua and Duoloshan are commercial suppliers of the hydroxide that was calcined to the target BET.

TABLE 7

Milling conditions and green milled mixture properties for the three samples made using 01HD attritor mill (500 g batch size) as part of $Y_2O_3$-doped NbO study

| HD01 Sample | 01HD Attritor Mill Comilling Conditions | | | Milled Slurry Properties | | Green Screening | Screened Granule |
|---|---|---|---|---|---|---|---|
| | Media (INCH) | Time (min) | Speed RPM | D50-60s US (μm) | BET ($m^2/g$) | Mesh ASTM | Bulk Density ($g/in^3$) |
| E | 1/16 | 100 | 700 | 1.05 | 5.07 | −140 | 13.8 |
| F | 1/16 | 135 | 700 | 1.06 | 6.09 | −140 | 14.7 |
| G | 1/16 | 135 | 700 | 1.02 | 5.80 | −140 | 17.5 |

TABLE 8

Table 8. Post-reaction characterization data for the three samples made as part of $Y_2O_3$-doped NbO study. All samples have been heat treated at 1375 C. for 240 min., followed by reaction in positive $H_2$ atmosphere (860 Torr) at 850 C. for 60 min., in furnace LF2. ~50 g of each sample, placed in a 3" alumina crucible.

| Sample | $Y_2O_3$ Added (wt %) | Powder BET ($m^2/g$) | SCOTT Density ($g/in^3$) | HORIBA PSD (μm) (LA-910) D90 (0s US) | D50 (0s US) | D50 (120s US) | ANODE dP (g/cc) | Green CRUSH (LB) | Wet Electricals @ $30V_f$ Vbias (V) | CV/g (μF·V/g) | DCL @ 180s (nA/CV) | Sinter Density (g/cc) | Sinter Shrinkage (% Dia) |
|---|---|---|---|---|---|---|---|---|---|---|---|---|---|
| E | 0.0 | 1.37 | 20.8 | 144 | 80 | 32 | 2.8 | 1.12 | 2.5 | 108638 | 0.10 | 3.02 | 1.12 |
|   |     |      |      |     |    |    |     |      | 10  | 85269  | 0.13 |      |      |
| F | 1.0 | 1.64 | 20.2 | 129 | 77 | 28 | 2.8 | 1.38 | 2.5 | 122076 | 0.11 | 3.08 | 2.06 |
|   |     |      |      |     |    |    |     |      | 10  | 92519  | 0.14 |      |      |
| G | 3.0 | 1.48 | 23.2 | 145 | 85 | 34 | 2.8 | 0.28 | 2.5 | 88406  | 0.12 | 2.93 | 0.68 |
|   |     |      |      |     |    |    |     |      | 10  | 67620  | 0.16 |      |      |

The powder flow rate was acceptable for capacitor grade powders. Observation of milled mixture properties showed a gradual increase in bulk density of screened granules with increasing $Y_2O_3$ concentration. This was probably due to the fact that milled slurries of $Y_2O_3$ doped samples were very stable (minimal settling with time) leading to the formation of a tightly packed sediment during drying. The BET surface area of milled mixtures was higher for $Y_2O_3$ doped samples, owing to the nanoscale particle size of $Y_2O_3$ powder used.

Figure 4:
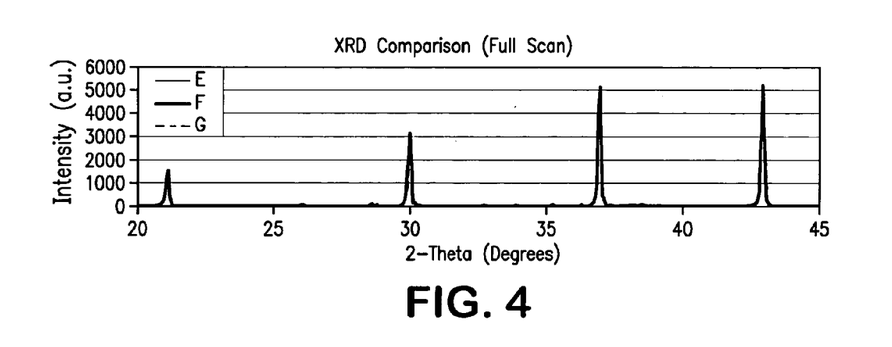
FIGS. 4 and 5 are x-ray diffraction graphs for certain samples of the present invention.
Figure 5:
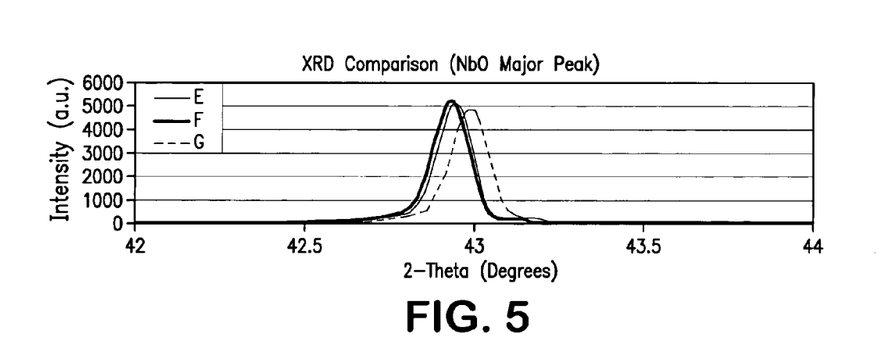

Electrical characteristics shown in Table 8 indicate that at 3 wt % $Y_2O_3$, CV/g is adversely effected, very likely due to the lowered dielectric constant triggered by the excessive substitution of Y ion in NbO lattice. In addition, physical characteristics are also adversely affected at 3 wt % $Y_2O_3$ (high Scott density and low crush strength). X-ray diffraction data shown in FIGS. 4 and 5 also confirms the significant change in structure of 3 wt % $Y_2O_3$ doped NbO (shift in major peak positions). However, at 1 wt % $Y_2O_3$, the material appears to behave very similar to control (pure NbO) sample, in both physical and electrical characteristics. Unlike $Nb_{1-x}Ta_xO$ type samples described earlier, the anode color after formation is not significantly different than the pure NbO control samples, indicating that the anodization constant was not affected by $Y_2O_3$ doping.

Figure 6A:
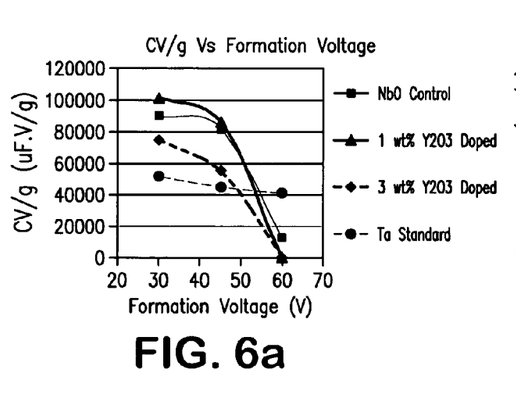
FIG. 6a is a graph showing CV/g behavior as a function of formation voltage for several samples.
Figure 6B:
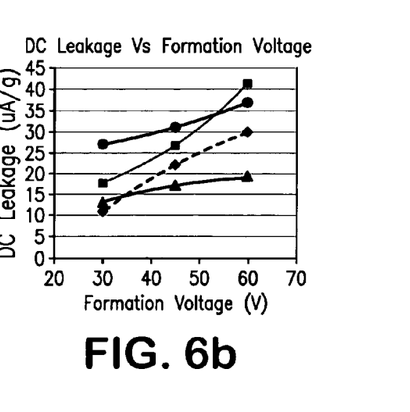
FIG. 6b is a graph showing DC leakage behavior as a function of formation voltage.

Additional testing was done at higher formation voltages to evaluate the DC leakage characteristics of $Y_2O_3$-doped samples. The data from these tests are graphically shown in FIGS. 6a and 6b. As evident from this data, 1 wt % $Y_2O_3$ doped sample showed significantly lower DC leakage at higher formation voltages. However, as also shown in FIG. 6a, the anodization constant remains more or less unchanged, therefore CV/g drops precipitously beyond 45V formation. At 45V formation, 1 wt % $Y_2O_3$ doped NbO appears to provide a viable dielectric layer with reasonable CV/g.

Example 3

Experimental design, raw materials and processing data, and characterization data for $Y_2O_3$ doped $Nb_{1-x}Ta_xO$ samples are shown in Tables 9-12. The milled particle size gradually decreased with addition of $Y_2O_3$ nanopowder. Higher granule bulk density (compared to pure NbO materials) is expected from heavier Ta substitution in these materials and remained roughly constant among all three samples.

TABLE 9

Experimental design for $Y_2O_3$ doped $Nb_{1-x}Ta_xO$ study

| NbO Lot # | Batch Size (g) | $Nb_{1-x}$ Target | $Ta_x$ Target | $O_y$ Target | N/O Target | Donor Oxide Type | wt % | Amount (g) |
|---|---|---|---|---|---|---|---|---|
| H | 575 | 0.61 | 0.39 | 0.94 | 1.06 | — | 0.00 | 0.00 |
| I | 575 | 0.61 | 0.39 | 0.94 | 1.06 | Y2O3 | 1.00 | 5.75 |
| J | 575 | 0.61 | 0.39 | 0.94 | 1.06 | Y2O3 | 2.00 | 11.50 |

TABLE 10

Raw material information for $Y_2O_3$ doped $Nb_{1-x}Ta_xO$ study

| NbO Lot # | NbH Feed Type | Wt (g) | $Ta_2O_5$ Feed Type | Wt (g) | Ta Feed Type | Wt (g) | Donor Oxide Type | wt % | Amount (g) |
|---|---|---|---|---|---|---|---|---|---|
| H | SG | 235 | DLS-1.00 $m^2/g$ | 300 | HP500-DB-B | 40 | — | 0.00 | 0.00 |
| I | SG | 235 | DLS-1.00 $m^2/g$ | 300 | HP500-DB-B | 40 | Y2O3 | 1.00 | 5.75 |
| J | SG | 235 | DLS-1.00 $m^2/g$ | 300 | HP500-DB-B | 40 | Y2O3 | 2.00 | 11.50 |

Ta feed: Basic Lot of C-515 Ta from Cabot Corporation

TABLE 11

Milling conditions and green milled mixture properties for the three samples made using 01HD attritor mill (500 g batch size) as part of $Y_2O_3$ doped $Nb_{1-x}Ta_xO$ study

| HD01 CM Lot # | 01HD Attritor Mill Comilling Conditions | | | Milled Slurry Properties | | Green Screening | Screened Granule |
|---|---|---|---|---|---|---|---|
| | Media (INCH) | Time (min) | Speed RPM | D50-60s US (μm) | BET ($m^2/g$) | Mesh ASTM | Bulk Density ($g/in^3$) |
| H | 1/16 | 120 | 700 | 1.30 | 3.81 | −140 | 19.6 |
| I | 1/16 | 120 | 700 | 1.06 | 4.20 | −140 | 20.0 |
| J | 1/16 | 120 | 700 | 0.96 | 3.84 | −140 | 19.7 |

TABLE 12

Table 12. Post-reaction characterization data for the three samples made as part of $Y_2O_3$ doped $Nb_{1-x}Ta_xO$ study. All samples have been heat treated at 1350 C. for 270 min., followed by reaction in positive $H_2$ atmosphere (860 Torr) at 850 C. for 60 min., in MRF furnace LF2. ~50 g of each sample, placed in a 3" alumina crucible.

| TEXT_ID | Powder BET ($m^2/g$) | SCOTT Density ($g/in^3$) | HORIBA PSD (μm) | | | Vf (V) | Vb (V) | CV/g (μF·V/g) | DCL @ 180s (nA/CV) | DCL @ 180s (μA/g) | Sinter Density (g/cc) | Sinter Shrinkage (% Dia) |
|---|---|---|---|---|---|---|---|---|---|---|---|---|
| | | | D90 (0s US) | D50 (0s US) | D50 (120s US) | | | | | | | |
| H | 1.54 | 25.9 | 220 | 105 | 42 | 20 | 10 | 81173 | 2.7 | 266.3 | 2.86 | −0.36 |
| | | | | | | 30 | 10 | 87145 | 16.7 | 1450.6 | 2.85 | −0.36 |
| | | | | | | 45 | 10 | — | — | — | — | — |
| I | 1.81 | 25.7 | 163 | 86 | 31 | 30 | 10 | 86573 | 2.0 | 174.6 | 2.89 | −0.45 |
| | | | | | | 45 | 10 | 565 | 109.5 | 61.9 | 2.89 | −0.45 |
| | | | | | | 60 | 10 | 37 | 2449.6 | 91.2 | 2.89 | −0.45 |
| J | 1.73 | 25.4 | 213 | 99 | 32 | 30 | 10 | 86010 | 0.5 | 42.7 | 2.91 | −0.15 |
| | | | | | | 45 | 10 | 581 | 51.5 | 29.9 | 2.92 | −0.15 |
| | | | | | | 60 | 10 | 14 | 5306.3 | 72.1 | 2.90 | −0.15 |

As evident from the data listed in Table 12, the final powder BET surface area (after the heat treatment and reaction) is consistent with milled mixture BET data discussed above. In general, the surface area values indicate fine particle size compared to a typical 80 k CV/g pure NbO powder (typically ranges between 1.2-1.4 $m^2/g$). Ta substitution in NbO appears to hinder sintering kinetics and particle growth during heat treatment process, leading to finer particle size.

From observing the electrical characteristics (also listed in Table 12), the fine particle size of these materials has led to a rapid decline in CV/g at high formation voltages (45V and 60V). However, $Y_2O_3$ addition has improved DC leakage characteristics tremendously. The undoped $Nb_{1-x}Ta_xO$ sample (Sample H) showed very high leakage. The sample with 2 wt % $Y_2O_3$ addition (Sample J) has acceptable DC leakage. Both 1 wt % and 2 wt % $Y_2O_3$ doped samples could be formed up to 60V. This is a remarkable improvement in overall applicability of this type of material.

Figure 7:
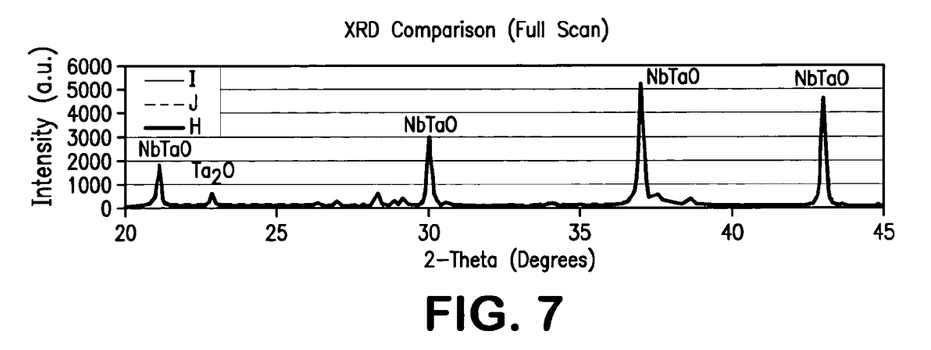
FIGS. 7 and 8 are x-ray diffraction graphs for certain samples of the present invention.
Figure 8:
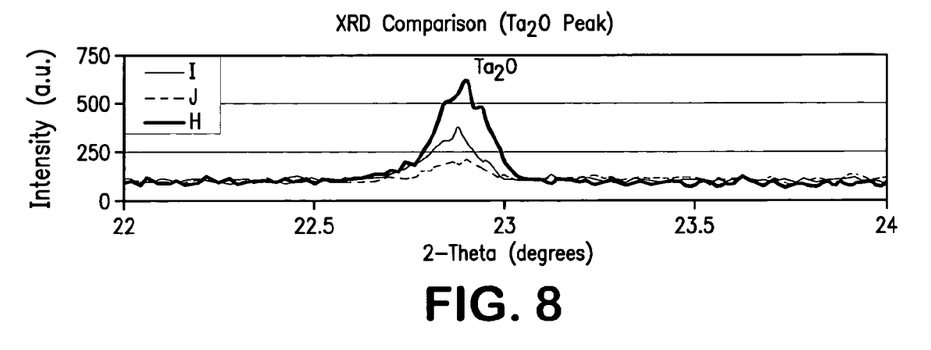
Figure 9:
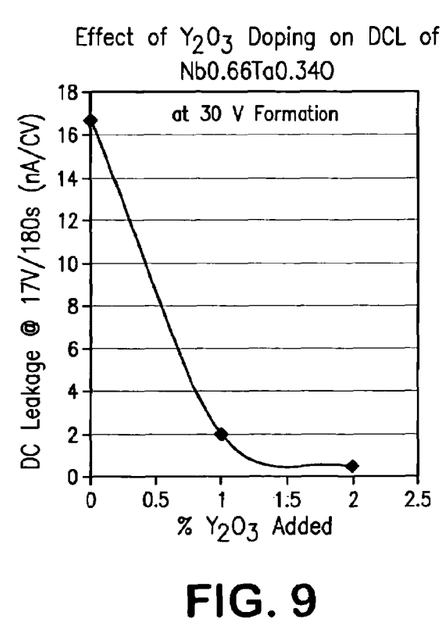
FIG. 9 is a graph showing DC leakage as a function of $Y_2O_3$ content in $Nb_{1-x}Ta_xO$ materials.
Figure 10:
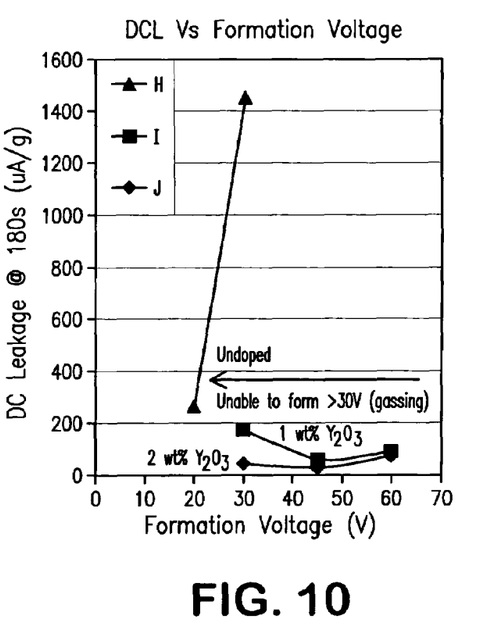
FIG. 10 is a graph showing DC leakage as a function of formation voltage for $Nb_{1-x}Ta_xO$ materials.

To further discuss the effect of $Y_2O_3$ addition on DC leakage behavior of $Nb_{1-x}Ta_xO$ type materials, XRD data on three samples of this study is shown FIGS. 7 and 8. As mentioned earlier, TEM analysis of the $Nb_{1-x}Ta_xO$ materials (undoped) in some previous samples showed inclusions of crystalline $Ta_2O_5$ phase in the anodized layer, which is believed to be one of the reasons for the high DC leakage of these materials. The XRD diffraction data on these powders showed detectable levels of crystalline $Ta_2O_5$. As seen in FIGS. 7 and 8, addition of $Y_2O_3$ has gradually and significantly reduced the level of residual crystalline $Ta_2O_5$ after heat treatment and reaction. The concurrent reduction DC leakage of these materials with $Y_2O_3$ addition (FIGS. 9 and 10) may indicate a strong relationship between crystalline $Ta_2O_5$ and DC leakage. In addition, there may be other mechanisms (besides lowered crystalline $Ta_2O_5$ in anodized layer) such as donor compensation by which $Y_2O_3$ acts to lower DC leakage as seen in doped NbO work.

Example 4

Additional Dopants in NbO: Experimental design, raw materials and processing data, and characterization data for donor oxide doped NbO samples are shown in Tables 13-16. Milled mixture properties are generally in the expected range for pure NbO type materials, with the exception of very high BET surface area of $SiO_2$ added sample (CM532). Nanosized fume silica source (Table 13), combined with lower density of $SiO_2$ has very likely contributed to the spike in BET and no other process variations are suspected. The reasons for higher than normal green granule bulk density for samples CM522 and CM532 are unknown, however, the Scott densities of heat treated samples from these lots are in the normal range (Table 16).

TABLE 13

Experimental design for the study of additional dopant oxides in NbO.

| Donor | Source | Catalog # | Description | Quantity (g) |
|---|---|---|---|---|
| Oxide | | | | |
| $Y_2O_3$ | Sigma-Aldrich* | 544892-25G | Yttrium(III) Oxide Nanopowder, 25-30 nm, 40-45 $m^2/g$ | 25 |
| $SiO_2$ | Sigma-Aldrich* | 637238-50G | Silica Nanopowder, 99.5%, 15 nm, 140-180 $m^2/g$ | 50 |
| $Al_2O_3$ | Sigma-Aldrich* | 544833-50G | Aluminum Oxide, 40-47 nm, gamma phase | 50 |
| $Mn_2O_3$ | Sigma-Aldrich* | 377457-250G | Manganese (III) Oxide, 99%, −325 mesh | 250 |
| $V_2O_3$ | Sigma-Aldrich* | 215988-100G | Vanadium (III) Oxide, 98% | 100 |
| $CeO_2$ | Sigma-Aldrich* | 544841-25G | Cerium (IV) Oxide, 10-20 nm, 80-100 $m^2/g$ | 25 |

| NbO Lot # | Batch Size (g) | $Nb_{1-x}$ Target | $Ta_x$ Target | $O_y$ Target | M/O Target | Donor Oxide Type | wt % | Amount (g) |
|---|---|---|---|---|---|---|---|---|
| K | 500 | 1.00 | 0.00 | 0.97 | 1.03 | Y2O3 | 2.00 | 10.00 |
| L | 500 | 1.00 | 0.00 | 0.97 | 1.03 | SiO2 | 2.00 | 10.00 |
| M | 500 | 1.00 | 0.00 | 0.97 | 1.03 | Al2O3 | 2.00 | 10.00 |
| N | 500 | 1.00 | 0.00 | 0.97 | 1.03 | MnO2 | 2.00 | 10.00 |
| O | 500 | 1.00 | 0.00 | 0.97 | 1.03 | V2O3 | 2.00 | 10.00 |
| P | 500 | 1.00 | 0.00 | 0.97 | 1.03 | Ce2O3 | 2.00 | 10.00 |

*Sigma-Aldrich, Inc., 1001 W. St. Paul Avenue, Milwaukee, WI 53233 USA

TABLE 14

Raw material information for the study of additional dopant oxides in NbO.

| NbO Sample | NbH Feed Type | NbH Feed Wt (g) | $Nb_2O_5$ Feed Type | $Nb_2O_5$ Feed Wt (g) | Donor Oxide Type | Donor Oxide wt % | Donor Oxide Amount (g) |
|---|---|---|---|---|---|---|---|
| K | SG | 290 | F&X-1.60 $m^2/g$ | 210 | Y2O3 | 2.00 | 10.00 |
| L | SG | 290 | F&X-1.60 $m^2/g$ | 210 | SiO2 | 2.00 | 10.00 |
| M | SG | 290 | F&X-1.60 $m^2/g$ | 210 | Al2O3 | 2.00 | 10.00 |
| N | SG | 290 | F&X-1.60 $m^2/g$ | 210 | MnO2 | 2.00 | 10.00 |
| O | SG | 290 | F&X-1.60 $m^2/g$ | 210 | V2O3 | 2.00 | 10.00 |
| P | SG | 290 | F&X-1.60 $m^2/g$ | 210 | Ce2O3 | 2.00 | 10.00 |

TABLE 15

Milling conditions and green milled mixture properties for the six samples made using 01HD attritor mill (500 g batch size) as part of the study of additional dopant oxides in NbO.

| HD01 Sample | 01HD Attritor Mill Cornilling Conditions | | | Milled Slurry Properties | | Green Screening | Screened Granule |
|---|---|---|---|---|---|---|---|
| | Media (INCH) | Time (min) | Speed RPM | D50-60s US (μm) | BET ($m^2/g$) | Mesh ASTM | Bulk Density ($g/in^3$) |
| K | 1/16 | 120 | 700 | 1.06 | 6.23 | −140 | 16.9 |
| L | 1/16 | 120 | 700 | 0.98 | 13.47 | −140 | 16.5 |
| M | 1/16 | 120 | 700 | 1.03 | 5.88 | −140 | 13.6 |
| N | 1/16 | 120 | 700 | 0.97 | 5.86 | −140 | 13.1 |
| O | 1/16 | 120 | 700 | 1.03 | 5.67 | −140 | 13.4 |
| P | 1/16 | 120 | 700 | 1.04 | 6.15 | −140 | 13.5 |

TABLE 16

Table 16. Post-reaction characterization data for the six samples made as part of the study of additional dopant oxides in NbO. All samples have been heat treated at 1350 C. for 270 min., followed by reaction in positive $H_2$ atmosphere (860 Torr) at 850 C. for 60 min., in MRF furnace LF2. ~50 g of each sample, placed in a 3" alumina crucible. Data for control and standard samples is also shown for comparison.

| SAMPLE | Powder BET ($m^2/g$) | SCOTT Density ($g/in^3$) | HORIBA PSD (Lm) D90 (0s US) | D50 (0s US) | D50 (120s US) | Vf (V) | Vb (V) | CV/g ($\mu F \cdot V/g$) | DCL @ 180s (nA/CV) | DCL @ 180s ($\mu A/g$) | Sinter Density (g/cc) | Sinter Shrinkage (% Dia) |
|---|---|---|---|---|---|---|---|---|---|---|---|---|
| K | 1.75 | 22.2 | 214 | 112 | 34 | 30 | 10 | 79624 | 0.19 | 15.01 | 2.94 | 0.21 |
|   |      |      |     |     |    | 45 | 10 | 62489 | 0.52 | 32.39 | 2.94 | 0.21 |
|   |      |      |     |     |    | 60 | 10 | —     | —    | 32.00 | 2.94 | 0.21 |
| L | 1.52 | 21.1 | 154 | 89  | 34 | 30 | 10 | 89687 | 0.14 | 12.39 | 2.97 | 0.31 |
|   |      |      |     |     |    | 45 | 10 | 81563 | 0.19 | 15.49 | 2.97 | 0.31 |
|   |      |      |     |     |    | 60 | 10 | 18976 | 0.80 | 15.09 | 2.97 | 0.31 |
| M | 1.72 | 21.2 | 158 | 92  | 40 | 30 | 10 | 91501 | 0.23 | 21.03 | 2.99 | 0.31 |
|   |      |      |     |     |    | 45 | 10 | 83168 | 0.39 | 32.33 | 2.97 | 0.31 |
|   |      |      |     |     |    | 60 | 10 | 385   | 67.44 | 25.96 | 2.97 | 0.31 |
| N | 1.32 | 22.5 | 158 | 91  | 41 | 30 | 10 | 84271 | 0.14 | 12.01 | 2.96 | 0.52 |
|   |      |      |     |     |    | 45 | 10 | 81977 | 0.20 | 16.14 | 2.97 | 0.52 |
|   |      |      |     |     |    | 60 | 10 | 45591 | 0.42 | 19.25 | 2.95 | 0.52 |
| O | 1.46 | 22.0 | 249 | 124 | 42 | 30 | 10 | 87397 | 1.38 | 120.84 | 2.99 | 0.85 |
|   |      |      |     |     |    | 45 | 10 | 63090 | 10.51 | 663.20 | 3.00 | 0.85 |
|   |      |      |     |     |    | 60 | 10 | —     | —     | 255.44 | 3.00 | 0.85 |
| P | 1.49 | 20.4 | 153 | 90  | 28 | 30 | 10 | 86009 | 0.59 | 50.99 | 3.25 | 3.50 |
|   |      |      |     |     |    | 45 | 10 | 79214 | 0.65 | 51.81 | 3.27 | 3.50 |
|   |      |      |     |     |    | 60 | 10 | 19801 | 2.18 | 43.16 | 3.28 | 3.50 |
| Q Control - Undoped NbO | 1.37 | 20.7 | 147 | 81 | 36 | 30 | 10 | 89662 | 0.33 | 29.20 | 2.94 | 0.40 |
|   |      |      |     |     |    | 45 | 10 | 82104 | 0.32 | 26.60 | 2.93 | 0.11 |
|   |      |      |     |     |    | 60 | 10 | 13019 | 3.17 | 41.30 | 2.81 | −1.17 |
| R Standard - Undoped NbO | — | — | — | — | — | 30 | 10 | 79311 | 0.18 | 13.92 | 3.08 | 2.02 |
|   |      |      |     |     |    | 45 | 10 | 75559 | 0.25 | 18.75 | 3.10 | 2.02 |
|   |      |      |     |     |    | 60 | 10 | 45397 | 0.57 | 25.98 | 3.09 | 2.02 |

Q was made on the same scale up as K-P, while R was made on a larger scale, more pure and closer to commercial grade NbO.

As listed in Table 16, the physical properties of all six new samples are in a close, normally expected range. One significant trend however, is the BET surface area of the heat treated powder, which varied between 1.32-1.72 $m^2/g$. It appears that various dopants affect kinetics of sintering and particle growth differently, leading to the variation in final surface area.

Figure 11:
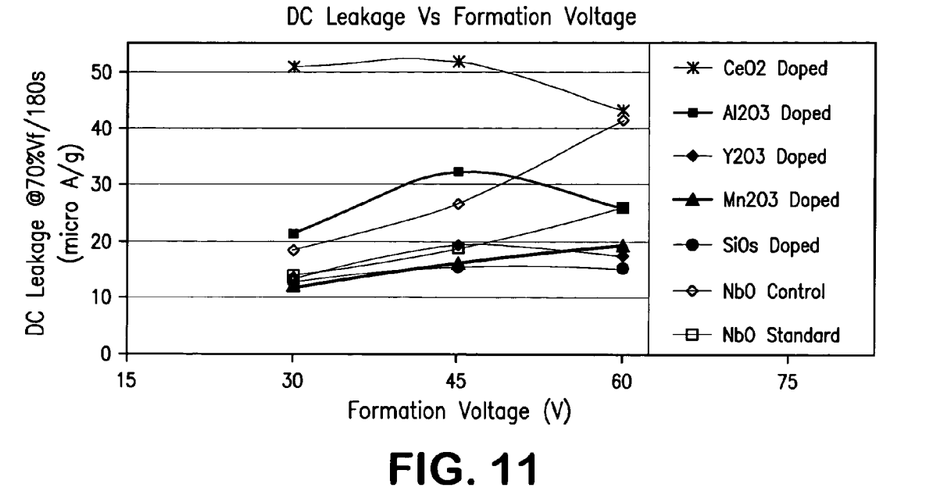
FIG. 11 is a graph showing DC leakage as a function of formation voltage for various donor oxide Nb suboxide materials.

As shown in FIG. 11 and listed in Table 16, the dopant oxides appear to have significant effect on DC leakage characteristics of NbO materials. Particularly, the samples doped with $Y_2O_3$, $SiO_2$, and $Mn_2O_3$ showed markedly lower DC leakage current at high formation voltage (60V). The data for $Y_2O_3$-doped sample confirms the beneficial effect.

Figure 12:
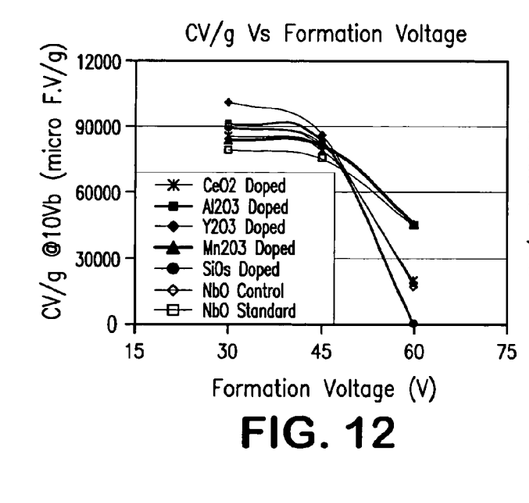
FIG. 12 is a graph showing CV/g as a function of formation voltage for various doped Nb suboxide materials.

CV/g Vs Formation Voltage behavior for these samples is shown in FIG. 12. With the exception of $Mn_2O_3$ doped sample, all samples possessed very low CV/g at 60V formation. As also shown in FIG. 12, the cap roll-off behavior is mainly dependent on primary particle size of the powder: smaller particles form away at a lower voltage than their large counterparts.

Example 5

Figure 13:
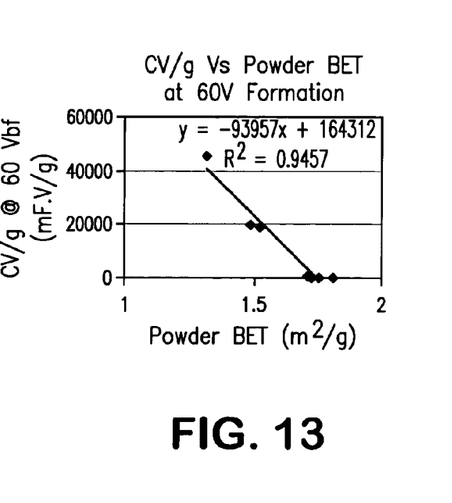
FIG. 13 is a graph showing CV/g as a function of powder BET surface area for various dopant Nb suboxide materials.
Figure 14:
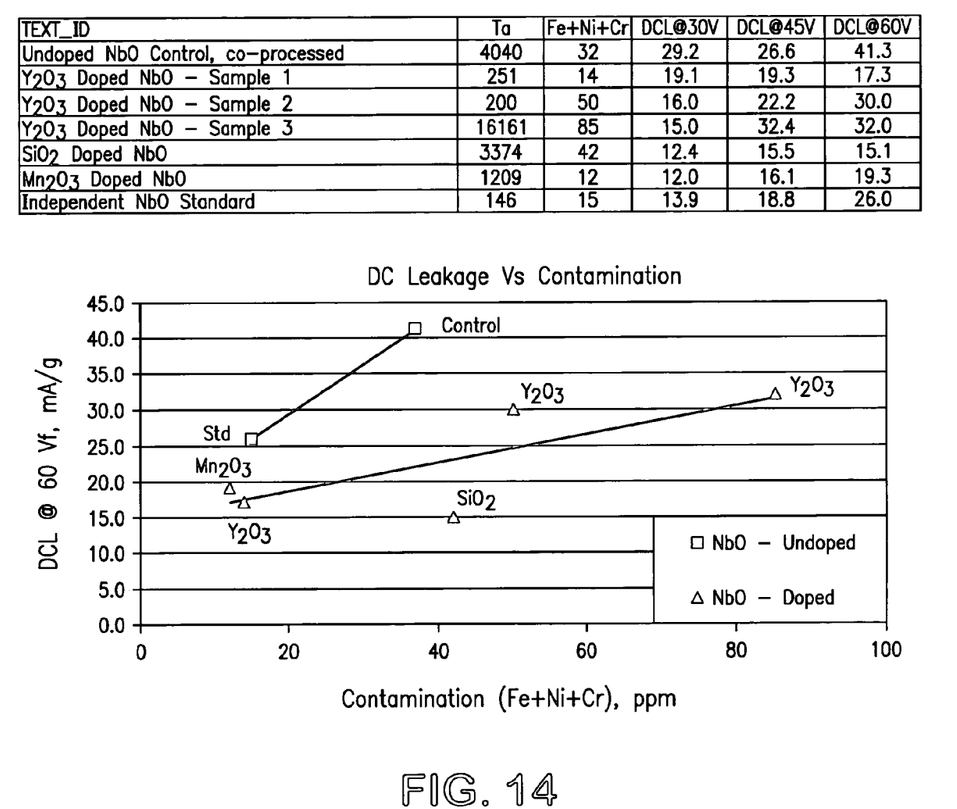
FIG. 14 is a graph showing DC Leakage (at 60V formation) as a function of metallic combination (Fe+Ni+Cr).

FIG. 13 shows the effect of donor oxides in reducing the contaminant-driven DC leakage in NbO powders. The doped powders are prepared in lab scale attritor mill that has steel lined chamber, which typically contaminates the samples with Fe, Ni, and Cr. The NbO-Control sample is made using the same equipment and process as the doped samples, for comparison. The NbO-Standard sample is made on Nb lined pilot scale milling equipment with reduced metallic contamination. As seen in FIG. 13, the DC leakage behavior of the doped samples is significantly better than the control sample. The slope of pure NbO data (Standard and Control) is markedly steeper than that of the doped samples. Since this technology may be applicable to Ta based capacitor powders, it may offer a solution to control DC leakage contribution from metallic contamination. FIG. 14 shows DC Leakage (at 60V formation) as a function of metallic combination (Fe+Ni+Cr). The figure shows the significantly lowered effect of contamination in elevating DC leakage of the doped niobium suboxide samples.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A niobium suboxide powder having the formula $Nb_xO_y$ that is doped with at least one dopant oxide, wherein x is less than 2 and y is less than 2.5x wherein said dopant oxide is an oxide of Y, Si, Mn, Al, or Ce, or any combination thereof, and said dopant oxide has a cation valency of +2 or higher, and wherein said dopant oxide is present in an amount of from 0.25% by weight to 2.5% by weight, based on the overall weight of the powder.

2. The niobium suboxide powder of claim 1, wherein said dopant oxide has an ionic size that is within 10% of an ionic size for niobium.

3. A capacitor anode comprising a sintered pressed body comprising the niobium suboxide powder of claim 1.

4. The capacitor anode of claim 3, wherein said capacitor anode further comprises a dielectric layer without any field-induced crystallization within said dielectric layer.

5. The capacitor anode of claim 3, wherein said capacitor anode is formed with a formation voltage of from 60 volts to 75 volts with a pressed density of 3.0 g/cc or higher, and sintered at a temperature of from 1000° C. to 1400° C. for 10 minutes or more at a formation temperature of 90° C.

6. The capacitor anode of claim 5, wherein said anode has a cumulative volume of pores of greater than 1 micron diameter of 0.010 mL/g or higher.

7. The niobium suboxide powder of claim 1, wherein said dopant oxide is $Y_2O_3$, $SiO_2$, $Mn_3O_4$, $Mn_2O_3$, $Al_2O_3$, $CeO_2$, or any combination thereof.

8. The niobium suboxide powder of claim 1, wherein said dopant oxide is $Y_2O_3$, $SiO_2$, $Mn_2O_3$, or any combination thereof.

9. The niobium suboxide powder of claim 1, wherein said dopant oxide is $Y_2O_3$, $SiO_2$, or any combination thereof.

10. The niobium suboxide powder of claim 1, wherein said dopant oxide is $Y_2O_3$.

* * * * *